Aug. 22, 1939.  L. J.-B. FORBES  2,170,749
FURNACE FOR HEATING GLASS PLATES FOR TEMPERING
Filed Feb. 7, 1936   3 Sheets-Sheet 1

Aug. 22, 1939.  L. J.-B. FORBES  2,170,749
FURNACE FOR HEATING GLASS PLATES FOR TEMPERING
Filed Feb. 7, 1936   3 Sheets-Sheet 3

Patented Aug. 22, 1939

2,170,749

UNITED STATES PATENT OFFICE 2,170,749

FURNACE FOR HEATING GLASS PLATES FOR TEMPERING

Lewis Jex-Blake Forbes, St. Helens, England, assignor to The American Securit Company, Wilmington, Del.

Application February 7, 1936, Serial No. 62,855
In Great Britain February 21, 1935

5 Claims. (Cl. 49—46)

This invention relates to the tempering of glass and has for its object an improved furnace for heating the glass.

In the heating of glass to be tempered, it has been found advantageous to heat the glass in a plurality of furnaces, so that the glass may be heated rapidly at first and slowly at the end.

The multi-stage furnaces hitherto proposed for heating glass for tempering, when the glass, in the form of sheets or plates, is suspended during the operations of heating and cooling, have been so disposed that the glass, suspended from a horizontal rail, enters the furnace at one end, through an end doorway temporarily opened to admit the glass, passes through the successive furnace stages, and leaves the furnace through an end doorway at the other end.

It has been found that glass tempered after heating in furnaces of this type, is liable to be defective in showing irregularities in tempering, and these irregularities have been traced to variations in the temperatures of the two end furnaces, caused by the opening of the end doors. When a door is opened, a strong current of air rises through the furnace near the opening and cools the furnace at this end, and the furnace therefore cannot be maintained throughout at a uniform temperature.

According to the invention, the furnaces are permanently closed to the outer air except through slots in their top stones. In the short time during which a furnace is open to the air through the slot in its top stone, no air current is formed in the furnace, and the upper part of the furnace near the slot is not appreciably cooled. The glass plates descend into the first furnace and rise out of the last furnace through the slots in their top stones and there is a slot giving communication between these slots through which the suspension means of the glass plates are adapted to pass as the plates travel from the first to the last furnace. Each plate is preferably suspended from a plate adapted to cover the slot in the top stone of each of the furnaces in succession. A lower runway and an upper return runway may be provided for the cover plate, each cover plate closing the slot in the top stone of a furnace while on the lower runway, and means are then provided for lowering a cover plate from the upper to the lower runway above the first furnace and of raising it from the lower to the upper runway above the last furnace.

Figure 2:
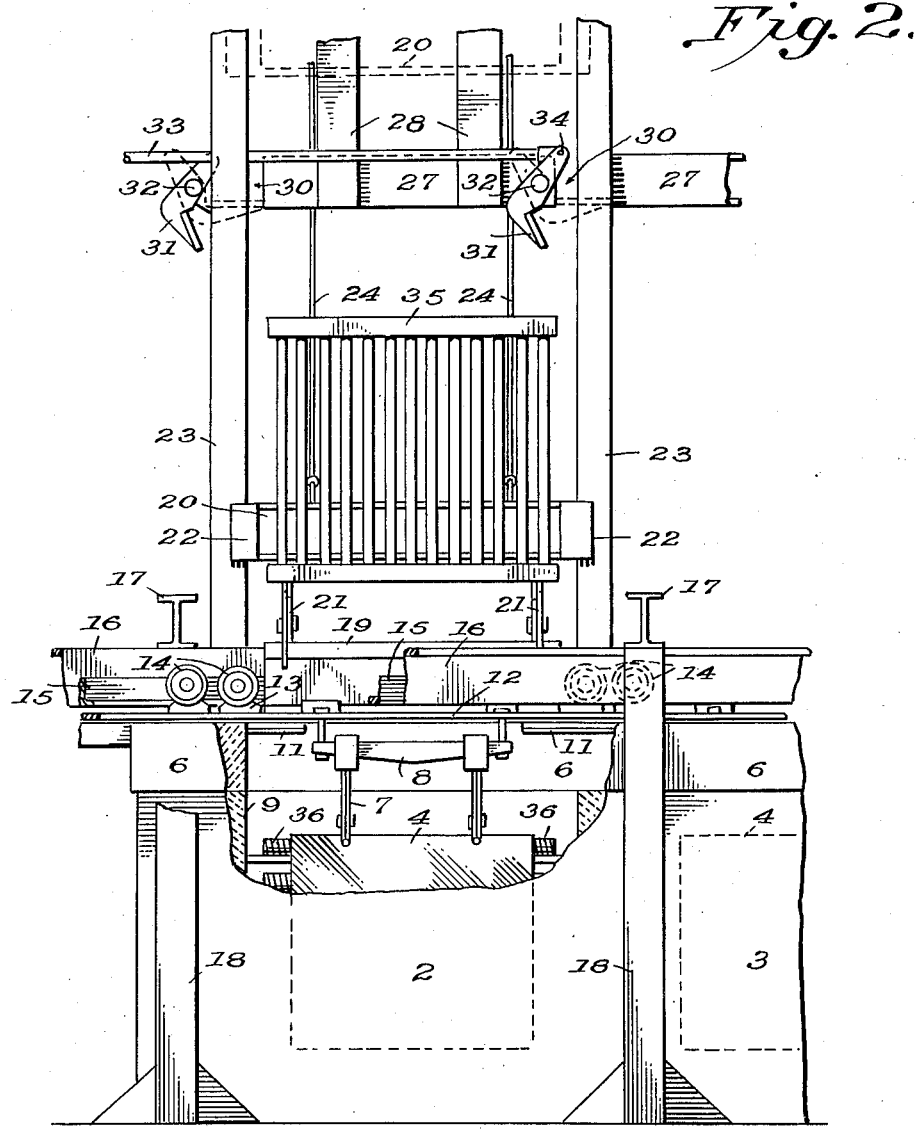
Figure 2 is a side view to a larger scale of the left hand end of Figure 1 with portions broken away.

Referring to the drawings, 1 is the first furnace, 2 is the last, and 3, 3, are intermediate furnaces of which there may be any number; glass plates in the furnaces are shown in dotted lines at 4. The furnaces are all in a line, with a narrow passageway 5 from the first to the last, extending as a slot 10 through the top stone 6, and giving passage to the glass plates 4, with their supporting tongs 7, and the tong bars 8 from which the tongs hang. The front wall of the furnace 2 has been broken away in Figure 2 to show these parts.

The first and last furnaces have end walls 9, so that the only opening into the furnaces is the narrow slot 10 through the top stone 6. The slot 10 is made still more narrow by the pieces 11, except in the central portions of the first and last furnaces, where free passage in and out of the furnaces is required for the tong bars 8.

Each tong bar 8 is suspended from a cover plate 12, extending the full length of each furnace, and faced with suitable heat insulating material. At each end of each cover plate 12 is a pedestal 13 carrying rollers 14 which run on angle irons 15, whereby the cover plates are supported just clear of the top stone 6. The angle irons 15 are attached to angle irons 16 running the whole length of the furnaces. These are supported on cross girders 17 which rest on uprights 18.

Figure 1:
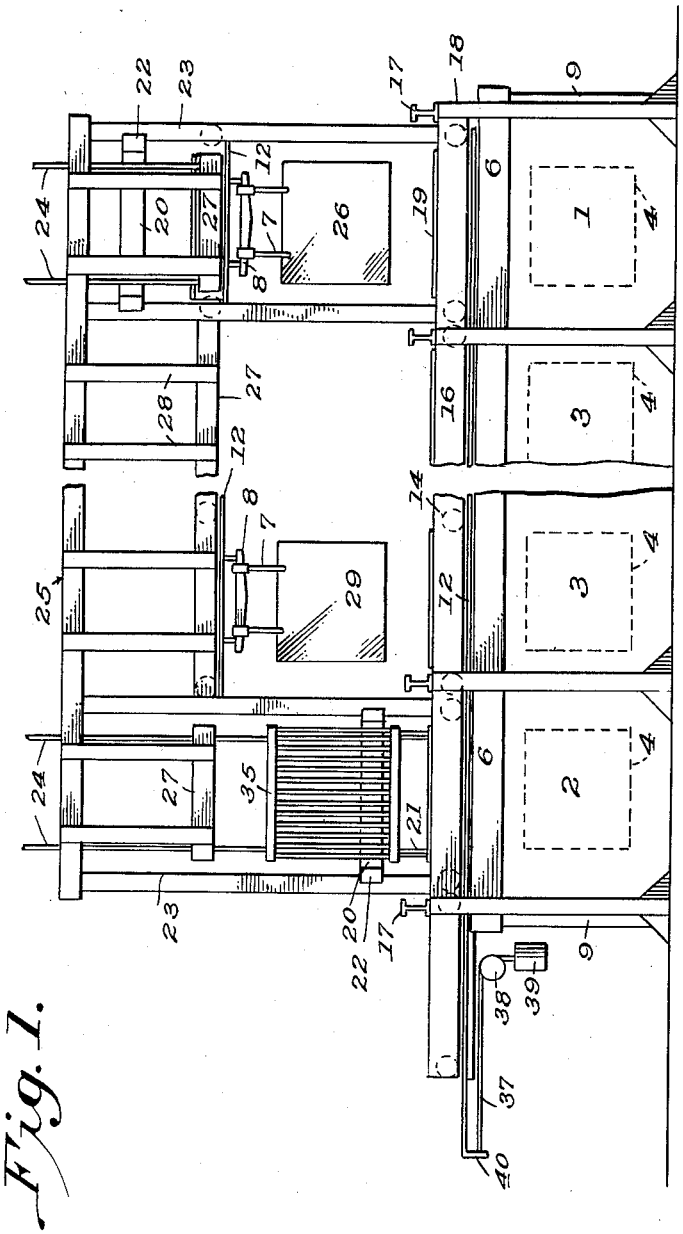
Figure 1 is a side view of the apparatus, partly broken away, with details omitted.
Figure 3:
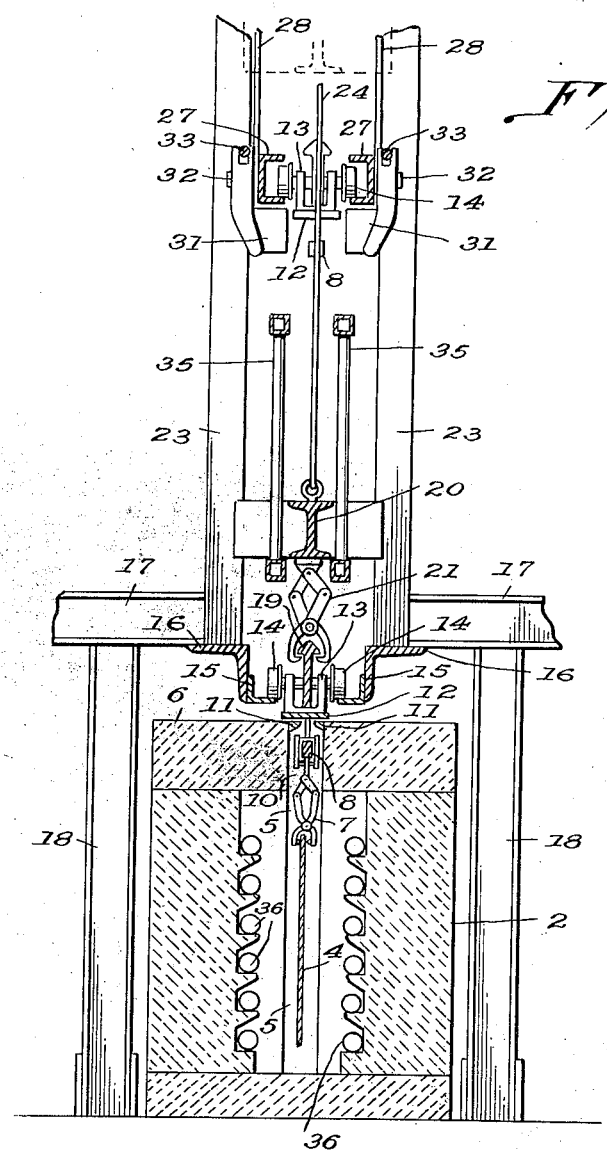
Figure 3 is a cross section through the centre line of the furnace of Figure 2.

Each cover plate 12 is provided with a bar with mushroom head 19. Above the first and last furnaces is suspended a girder 20 carrying tongs 21 adapted to engage the mushroom head bar 19. The girder 20 is provided with end blocks 22 which are guided vertically by the uprights 23, supported on the angle irons 16. The two girders 20 are suspended by ropes 24 from hoisting gear (not shown) above the upper frame members 25 (Figure 1). By the ropes 24, the girders 20 can be lowered into the position shown in Figures 2 and 3, and above furnace 2 in Figure 1, or raised into the position shown in dotted lines in Figures 2 and 3 and in full lines above furnace 1 in Figure 1. In the lower position of the girder 20, the cover plate 12 rests with its rollers 14 on the angle irons 15, and in the upper position the cover plate 12 is raised so that the glass plate depending from it occupies the position of the plate 26 above furnace 1 in Figure 1. When in this latter position, the cover plate 12 rests with its rollers 14 on the channels 27, which (except for gaps to be explained later) extend the whole length of the furnaces, and are supported by hangers 28 from the upper frame members 25. The cover plate supporting the glass plate 29 (Figure 1) is seen in this position, in end elevation, in Figure 3, but the tongs 7 are not shown in this figure.

In order that the rollers 14 may be able to reach the level of the channels 27, gaps 30 are left in the channels above the last furnace 2, to give passage to the rollers. These gaps can be closed by two members 31 pivoted at 32 to the uprights 23 and the channels 27 respectively. Rods 33 are pivoted to the members 31 at 34. In the position shown in Figures 2 and 3, the gaps 30 are open, and the cover plate 12 can be raised from the lower to the higher position, when so raised, the rods 33 are drawn to the left, and thereby the members 31 close the gaps 30 by providing support for the rollers 14, and the cover plate can then be run on the channels 27 from the position above the furnace 2 into the position shown in Figure 1 in which it is supporting the plate 29. A similar device is provided to close similar gaps above furnace 1, so that a cover plate above this furnace can be lowered into the lower position.

When a cover plate 12, with depending glass plate 4 is raised from furnace 2 into its upper position, the glass plate is then between a pair of blowing frames 35, by means of which it can be cooled. The supports for, and air pipes to, the blowing frames 35 are not shown. The furnace 2 is shown with electrical heating elements 36 arranged along each of its inner walls.

The operation of the apparatus is as follows, starting with the condition that there is a plate of glass in each furnace: When the plate in furnace 2 has remained there for the required time, the girder 20 above the furnace is lowered so that its tongs 21 engage the mushroom header bar 19. The girder 20 is then raised, drawing the plate out of the furnace, till the cover plate 12 has its roller 14 on a level with the channels 27, and then the rod 33 is drawn to the left to move the members 31 to support the rollers 14. The plate is then between the blowing frames 35 and these are operated to cool it. As soon as the plate has been raised out of the furnace 2, the cover plate 12 over furnace 1 is moved to the left, pushing the cover plates to the left of it, until the extreme one is over furnace 2; each plate has then been moved into the next adjacent furnace to the left. As soon as this operation has been completed, the girder 20, supporting a cover plate with depending plate 26 over furnace 1 is lowered, introducing the plate into furnace 1. The tongs 21 are then disengaged from the bar 19 and the girder 20 returned to its upper position. As soon as the first mentioned plate has been cooled, the cover plate from which it hangs is run along the channels 27 until the plate occupies a position such as that of the plate 29. The plate is then removed and a new plate is hung on the tongs 7, and the cover plate is then run into position above furnace 1, where its bar 19 is engaged with the tongs 21 of the girder 20. This completes the cycle of operations.

An auxiliary cover plate 12, with a tong bar, is preferably located to the left of furnace 2 and so arranged as to close the slot in the top stone of the furnace automatically, as soon as the cover plate previously on the furnace has been raised. To effect this, lugs 40 depending from the plate are attached to cables 37 passing over pulleys 38; weights 39 on the cables then tend to move the cover plate to the right to a position over furnace 2.

The operations of the above-described cycle may be effected independently, or the cyclical movement of the cover plates may be effected automatically at timed intervals.

As an alternative to the above described cyclical operation, the glass plates, suspended from their tong bars may be run from the first to the last furnace on a runway in the furnaces, through the intermediate furnaces, if any. In this case, the girders 20 are permanently attached to cover plates and the tong bars are detachably hung from the cover plates as by tongs such as the tongs 21.

By means of this apparatus, the temperatures of the furnaces may be so adjusted that the rate of rise of temperature of the glass plates diminishes as the plates approach the desired final temperature, and, by reason of the complete enclosure of the furnaces except for the narrow slot in their top stones, it is possible to maintain a uniform temperature throughout each furnace. Since the temperature difference between any one furnace and an adjacent furnace is small, interchange of heat between the furnaces by air currents in the passage way 5 is so small as not appreciably to affect the uniformity of temperature in any one furnace.

Apart from its advantage in maintaining uniformity of temperature in the furnaces, the invention has the advantage of a lower heat loss than in multi-stage furnaces of known type.

Having described my invention, I declare that what I claim and desire to secure by Letters Patent is:

1. A multi-stage furnace for heating vertical glass plates for tempering, comprising in combination a plurality of furnaces, top stones for the first and last furnaces provided with slots through which plates can be inserted and removed respectively in a vertical direction, suspension means for the plates, means adapted to permit movement of the plates from the first furnace to the last furnace, an intermediate top stone provided with a slot giving communication between the slots in the first and last top stones along which slot said suspension means are adapted to pass as the plates travel from the first to the last furnace, and means adapted to permanently close the furnaces to the outer air except at the slots in the first and last top stones.

2. A multi-stage furnace for heating vertical glass plates for tempering, comprising in combination a plurality of furnaces, top stones for the first and last furnaces provided with slots through which plates can be inserted and removed respectively in a vertical direction, suspension means for each plate, means adapted to permit movement of the plates from the first furnace to the last furnace, an intermediate top stone provided with a slot giving communication between the slots in the first and last top stones along which slot said suspension means are adapted to pass as the plates travel from the first to the last furnace, and a cover plate supporting the suspension means for each plate adapted to cover the slot above each of the furnaces in succession.

3. A multi-stage furnace for heating vertical glass plates for tempering, comprising in combination a plurality of furnaces, top stones for the first and last furnaces provided with slots through which plates can be inserted and removed respectively in a vertical direction, an intermediate top stone provided with a slot giving communication between the slots in the first and last top stones, suspension means for each plate, a cover plate by which said suspension means are supported, and a runway along which each cover plate is movable to cover the slot above each of the furnaces in succession and to carry a plate from the first to the last furnace.

4. A multi-stage furnace for heating vertical glass plates for tempering, comprising in combination a plurality of furnaces, top stones for the first and last furnaces provided with slots through which plates can be inserted and removed respectively in a vertical direction, an intermediate top stone provided with a slot giving communication between the slots in the first and last top stones, suspension means for each plate, a cover plate by which said suspension means are supported, a lower runway along which each cover plate is movable to cover the slot above each of the furnaces in succession and to carry a plate from the first to the last furnace, an upper return runway for the cover plates, means for lowering a cover plate from the upper to the lower runway above the first furnace and means for raising a cover plate from the lower to the upper runway above the last furnace.

5. A multi-stage furnace for heating vertical glass plates for tempering, comprising in combination a plurality of furnaces, top stones for the first and last furnaces provided with slots through which plates can be inserted and removed respectively in a vertical direction, an intermediate top stone provided with a slot giving communication between the slots in the first and last top stones, suspension means for each plate, a cover plate by which said suspension means are supported, a lower runway along which each cover plate is movable to cover the slot above each of the furnaces in succession and to carry a plate from the first to the last furnace, an upper return runway for the cover plates, means for lowering a cover plate from the upper to the lower runway above the first furnace means for raising a cover plate from the lower to the upper runway above the last furnace and means adapted automatically to cover the slot above the last furnace when a cover plate is raised from the lower to the upper runway.

LEWIS JEX-BLAKE FORBES.